United States Patent [19]

Noda et al.

[11] Patent Number: 4,512,889
[45] Date of Patent: Apr. 23, 1985

[54] FILTER PRESS

[75] Inventors: Ichiro Noda; Yasuhiro Suekane; Hisao Nakao, all of Sakaide, Japan

[73] Assignee: Ishigaki Kiko Co., Ltd., Tokyo, Japan

[21] Appl. No.: 540,371

[22] Filed: Oct. 11, 1983

[30] Foreign Application Priority Data

Oct. 19, 1982 [JP] Japan ............................ 57-184078

[51] Int. Cl.³ ............................................. B01D 25/12
[52] U.S. Cl. .................................... 210/225; 100/198; 210/227
[58] Field of Search .............. 210/224, 225, 226, 227, 210/228, 229, 230, 231; 100/194, 196, 197, 198

[56] References Cited

U.S. PATENT DOCUMENTS 4,108,777  8/1978  Kurita et al. .................. 210/231 X
4,172,792  10/1979  Heinrich et al. ................... 210/230
4,209,404  6/1980  Yoshida ......................... 210/230 X

FOREIGN PATENT DOCUMENTS 55765  12/1980  Japan .

Primary Examiner—Richard V. Fisher
Assistant Examiner—W. Gary Jones

[57] ABSTRACT

A filter press of the type having a multiplicity of filter plates adapted to be sequentially separated from one another, one or more at a time, to allow removal of cakes from filter cloths between each two adjacent plates. A pair of filter cloths covering the opposed surfaces of each two adjacent plates are supported by support means adapted to allow up and down movement of the cloths between the two plates when separated from each other. Drive means for moving the cloths upwardly comprise a filter-cloth suspension-bar driving mechanism adapted for ready engagement with and disengagement from a filter-cloth suspension bar to which are secured the upper ends of the cloths.

1 Claim, 9 Drawing Figures

FIG. 6
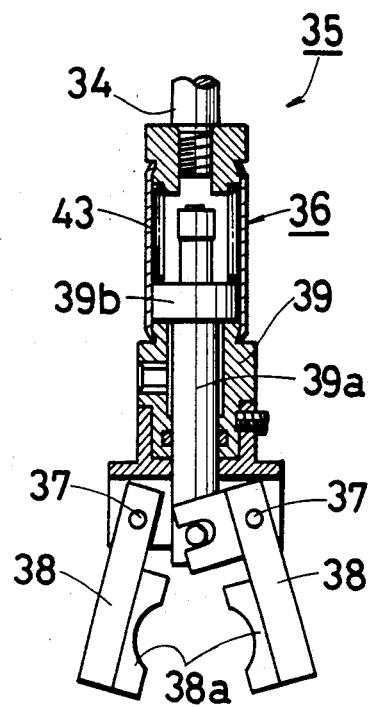
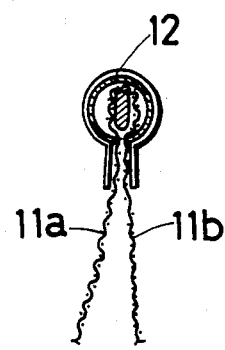

1

FILTER PRESS

BACKGROUND OF THE INVENTION

1. Field of the Invention

The present invention relates to a filter press of the type having a multiplicity of filter plates arranged side by side on a pair of guide rails extending in parallel and which are adapted to be separated one by one or by twos or more so that cakes are removed from filter cloths between each two adjacent plates separated.

2. Description of the Prior Art

Filter presses of the type have an advantage over those of simultaneous plate-opening type in which the filter plates are connected in series so that they can be simultaneously separated from one another in equispaced apart relation. The former type requires less space for installation, and therefore, same space permits arrangement of a greater number of plates, which means larger area available for filtration.

However, most of conventional filter presses of sequential plate-opening type are such that at least a portion of each filter cloth is fixed to the filter plate. A prior-art disclosure which deals with a filter press of such type in which filter cloths on each two adjacent filter plates separated are actuated for movement between the plates to allow discharge of cakes from the cloths as in the case of a simultaneous plate-opening type filter press is Japanese Utility Model Provisional Publication No. 55765 of 1980; and no other disclosure of such nature has been found.

This prior-art system is such that means for moving filter cloths between filter plates separated comprise drive means for chains connected to bars to which the cloths are secured. One disadvantage with this system is that the drive means involve a lot of gears. Another disadvantage is that each time plates are separated, gears have to be shifted for engagement with and disengagement from other gears before they are put in driving operation. Indeed, such drive means are very complicated in construction and require a high degree of mechanical precision. Because of these difficulties said prior-art system has not yet been reduced to practical application.

SUMMARY OF THE INVENTION

An object of the present invention is to provide a filter press of sequential plate-opening type having drive means for moving filter cloths, free from aforesaid disadvantages and adapted to allow up-and-down movement of the cloths between each two adjacent filter plates, when separated, so as to facilitate discharge of cakes from the cloths.

Another object of the present invention is to provide a filter press of the type which permits more smooth and more positive removal of cakes from filter cloths as compared with conventional filter presses having no means for moving filter cloths.

The filter press according to the invention comprises a pair of filter cloths disposed between each two adjacent plates so as to cover the surfaces thereof and which are secured at the upper ends thereof to a filter-cloth suspension bar, one of said pair of filter cloths being so disposed as to cover the surface of front-side one of the said two plates and in engagement at the lower end portion thereof with a roller disposed below said front-side plate, the other one of said cloths being so disposed as to cover the surface of rear-side one of said two plates and in engagement at the lower end portion thereof with a roller disposed below said rear-side plate, said filter cloths each being up and down movably supported for movement over the length of its portion extending between said suspension bar and one or the other of said rollers, and drive means for moving each of the filter cloths upwardly over said length, said means consisting of a filter-cloth suspension bar driving mechanism adapted for ready engagement with and disengagement from said suspension bar.

Other features and advantages of the invention will be apparent from the following description taken in connection with the accompanying drawings.

BRIEF DESCRIPTION OF THE DRAWINGS

In the drawings, which illustrate preferred embodiments of the invention:

FIG. 6 is a vertical view showing ready-to-engage-and-disengage means for holding a filter-cloth suspension bar;

DETAILED DESCRIPTION OF THE PREFERRED EMBODIMENTS

Figure 1:
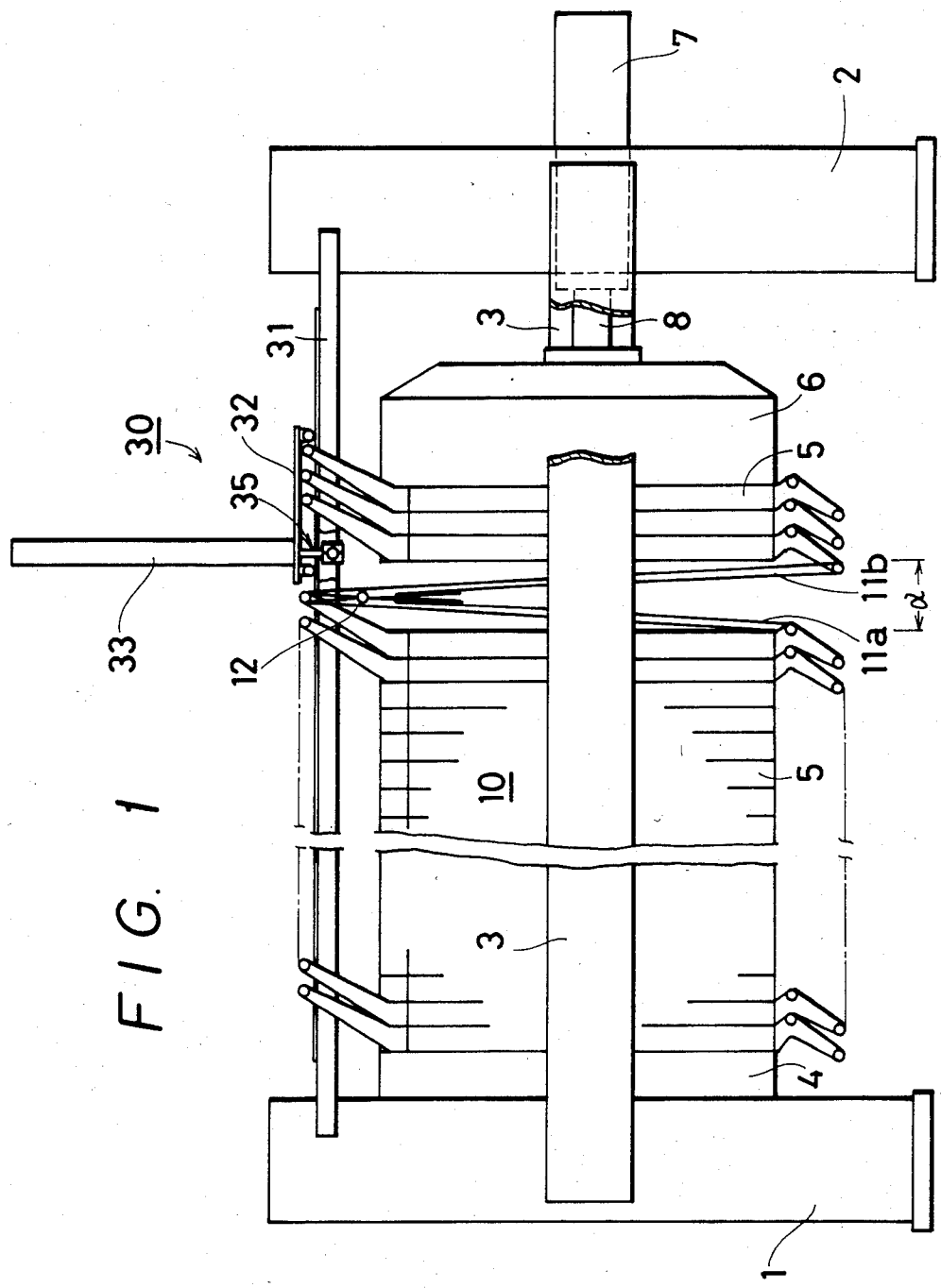
FIG. 1 is a side view of a filter press embodying the present invention.
Figure 2:
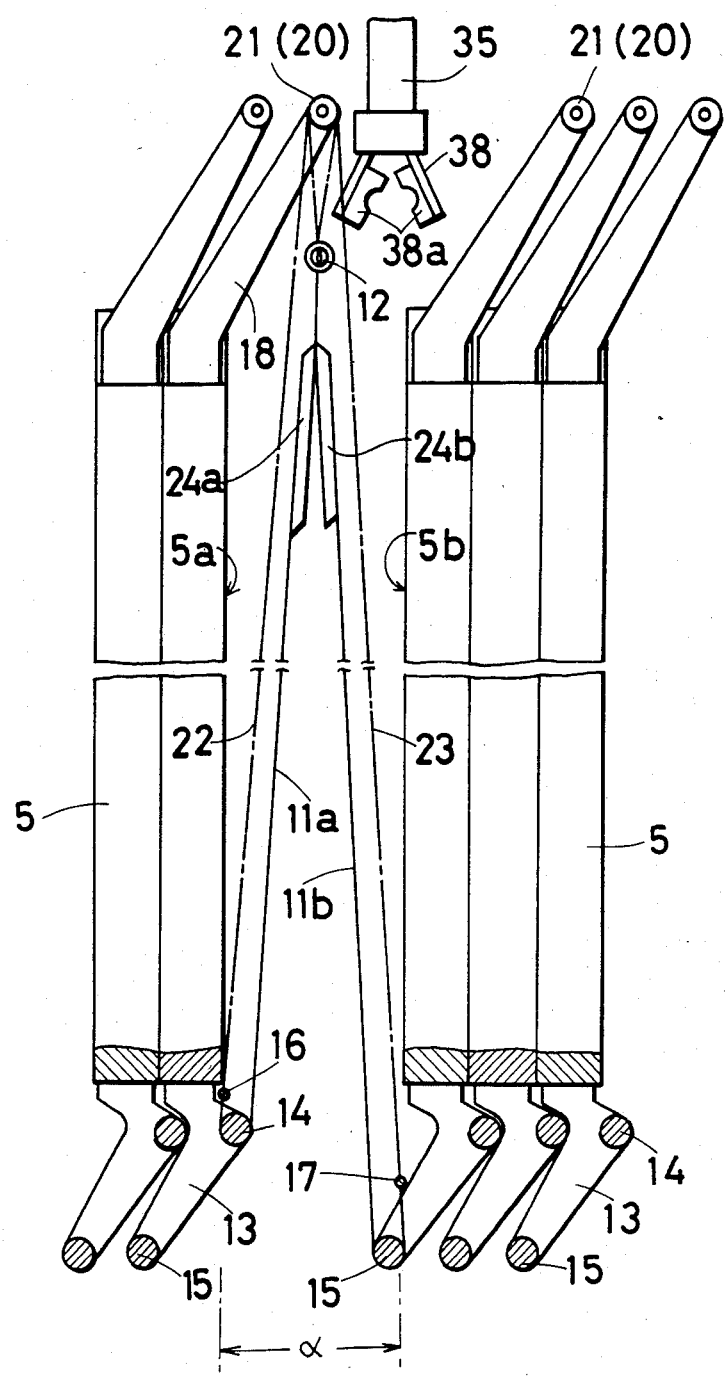
FIGS. 2 and 3 are side views illustrating filter cloths as they appear between two adjacent filter plates separated.
Figure 3:
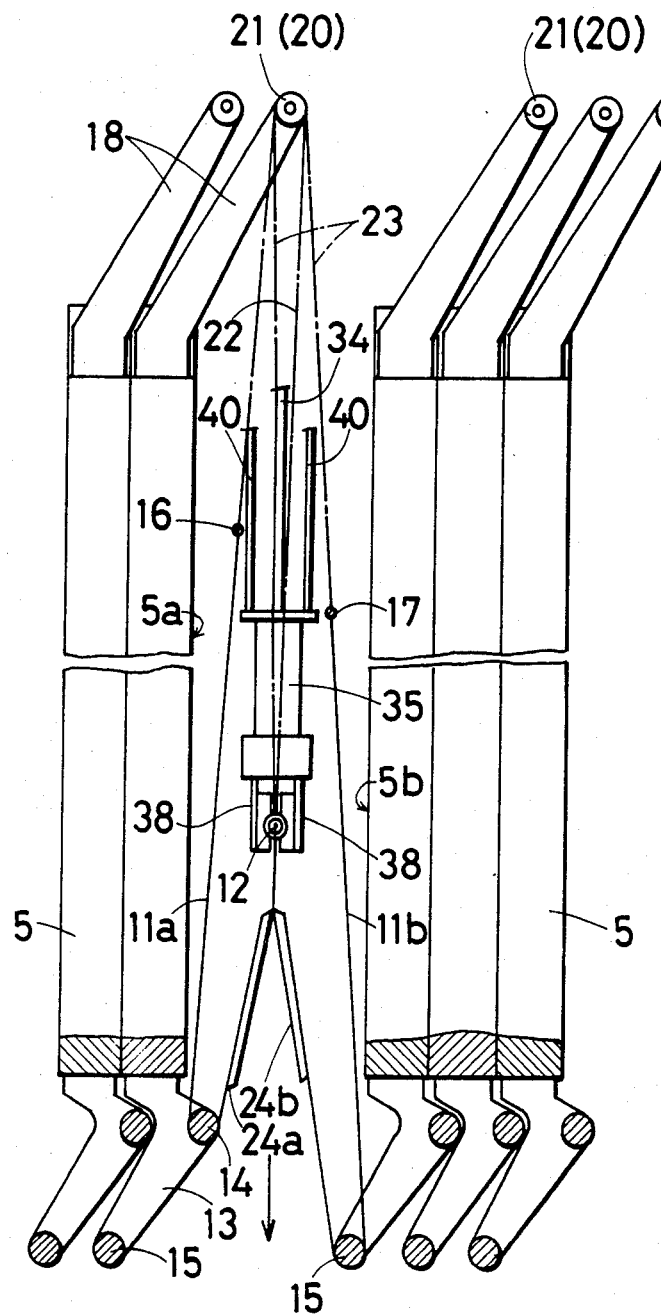

Referring to FIGS. 1 to 6, inclusive, in which one embodiment of the invention is illustrated, reference numerals 1 and 2 designate front and rear frames by which are horizontally supported a pair of guide rails 3, 3 extending in parallel. Between the guide rails 3, 3 there are disposed a stationary head 4 and a multiplicity of filter plates 5, 5—and a clamping head 6. The filter plates 5, 5—and clamping head 6 are supported by arms and/or wheels not shown for back and forth movement along the guide rails 3, 3, as in the case of known filter presses. A hydraulic cylinder 7 is disposed between the clamping head 6 and the frame 2. Reference numeral 10 generally designates a filter press. In the present instance, the filter press 10 is such that if a piston rod 8 of the hydraulic cylinder 7 is stretched to move the clamping head 6 forward (leftward as in FIG. 1), the filter plates 5, 5—can be clamped together into a closed condition to allow filtering operation, while if the hydraulic cylinder 7 is contracted to retract the clamping head 6 to the position shown in FIG. 1, the filter plates 5, 5—can be separated one by one by known sequential plate-opening means (not shown), at spaces of $a$ and in order of proximity to the clamping head 6.

Now, filter-cloth moving means according to the invention will be explained particularly with reference to FIGS. 4 and 5. Between each two adjacent filter plates 5, 5 there are present a pair of filter cloths 11a, 11b covering the surfaces 5a, 5b of the plates 5, 5 and secured at their upper ends to a filter-cloth suspension bar 12. One (11a) of the filter cloths 11a, 11b is disposed so as to cover the rear surface 5a of front-side one of the filter plates 5, 5 and is in engagement with a roller 14, one of two rollers 14, 15 disposed below the front-side plate 5 and rotatably supported through a bracket 13; and the other (11b) of the cloths 11a, 11b is disposed so as to cover the front surface 5b of rear-side one of the plates 5, 5 and is in engagement with a roller 15, one of two rollers 14, 15 disposed below the rear-side plate 5 and rotatably supported through a bracket 13. To ensure that filter cloths 11a, 11b, each is movably supported, constantly under tension, for up and down movement between the surfaces 5a, 5b of the plates 5, 5 and over the length of its portion extending between the suspension bar 12 and one or the other of the rollers 14, 15, as the case may be, said cloths 11a, 11b are movably engaged by the rollers 14 and 15 respectively, and further they are secured at their lower ends to filter-cloth securing bars 16, 17 disposed above the rollers 14, 15. One (16) of said bars 16, 17 is connected to said suspension bar 12 through chains 22, each trained around a chain wheel 20 disposed above the front-side one of the filter plates 5, 5 and rotatably supported through a bracket 18. Similarly, the other filter-cloth securing bar 17 is connected to said suspension bar 12 through chains 23, each trained around a chain wheel 21 disposed above the front-side filter plate 5 and rotatably supported through bracket 18.

Through the above described arrangement, an upward or downward movement of the filter-cloth suspension bar 12 results in a reverse movement of the filter-cloth securing bars 16, 17. That is, if the suspension bar 12 is lowered, the filter-cloth securing bars 16, 17 are elevated. As said bars 16, 17 are elevated, those portions of filter cloths 11a, 11b which have been positioned above the rollers 14, 15, that is, those portions which have covered the surfaces 5a, 5b of the filter plates 5, 5 respectively during filtering operation, are lowered over their lengths to the levels of rollers 14 and 15 respectively so that the opposed surfaces of the cloths 11a, 11b are turned away from each other. In other words, filter cloths 11a, 11b are moved in a see-saw pattern, while being kept under tension, by chains 22, 23 through which the filter-cloth securing bars 16 and 17 are individually connected to the filter-cloth suspension bar 12, the roller positions at 14, 15 being defined as the lower extremities for movement of the cloths 11a, 11b respectively.

Further, between each pair of filter cloths 11a, 11b and at a location adjacent their upper ends there are provided feed plates 24a and 24b fixed to the cloths 11a and 11b respectively so that when the correponding two adjacent filter plates 5, 5 are in closed position, slurry is supplied onto the cloths 11a, 11b through feed passages 25 provided in the feed plates 24a, 24b. Referring to the rollers 14, 15 rotatably supported in the bracket 13, it is noted that their locations are suitably selected so that there is no interference among rollers 14, 14, 15, 15 and/or 14, 15 of individual plates 5, 5 when the plates 5, 5 are in closed position and so that there is no possibility of filter cloths 11a, 11b or filter-cloth securing bars 16, 17 striking the filter plates 5 when the filter plates 5, 5 are separated. Said bracket 18 is so designed that its upper end extends substantially backwardly so that said sprocket wheel 20, 21 rotatably supported on the front-side plate 5 are substantially centrally located between each two adjacent plates 5, 5 separated, as can be seen from the drawings. Thus, the filter-cloth suspension bar 12 to which the upper ends of the filter cloths 11a, 11b are secured is lowered and elevated substantially centrally between two adjacent plates when they are separated.

Next, one form of filter-cloth suspension-bar drive mechanism 30 adapted for ready engagement with and disengagement from the suspension bar will be explained. Referring to FIGS. 1 to 6, said drive mechanism comprises rails 31, 31 disposed above the filter plates 5, 5—and in parallel relation to the guide rails 3, 3 between the frames 1, 2, a carriage 32 movably mounted on the rails 31, 31, hydraulic cylinders 33 mounted on the carriage 32, and filter-cloth suspension-bar holding means 35, readily engageable with and disengageable from the suspension bar. Said holding means 35 comprise, as can be seen from FIG. 6, a body 36 attached to the front end of the piston rod 34, a pair of arms 38, 38 having their respective bases pivotally supported at 37, 37 on the underside of the body 36, and a hydraulic cylinder 39 for simultaneously actuating free ends of said arms 38, 38 to open and close. Said ready-to-engage-and disengage holding means 35 for said suspension bar are such that if a piston rod 39a of the hydraulic cylinder 39 is stretched, the arms 38, 38 are opened so that the piston rod 34 may be stretched to bring the arms 38, 38 to a position which permits their pawls 38a, 38a to grasp the filter-cloth suspension bar 12. Thereupon, if the piston rod 39a is contracted to allow the free ends of the arms 38, 38 to be closed, the suspension bar 12 can be suitably seized by pawls 38a, 38a provided on opposed faces of the arms 38, 38. On the carriage 32 there are disposed such ready-to-engage-and disengage holding means 35 in one pair. Said pair of holding means 35, 35 can be brought in or out of engagement simultaneously.

As above stated, in this embodiment, the arms 38, 38 have pawls 38a, 38a provided on their opposed faces so that the filter-cloth suspension bar 12 can be securely held by pawl grasping. In case where holding means 35 having a pair of such arms 38, 38 are employed, if the holding means are lowed as they are in open-arm condition, the body 36 between the arms 38, 38 may strike the suspension bar 12. Therefore, a modified form of holding means 35 may be of such arrangement that the pawls provided on the opposed surfaces in one or both of the arms are adapted to engage the underside of the suspension bar 12 so that the suspension bar 12 may be securely seized without being subject to grasping (not shown).

Figure 4:
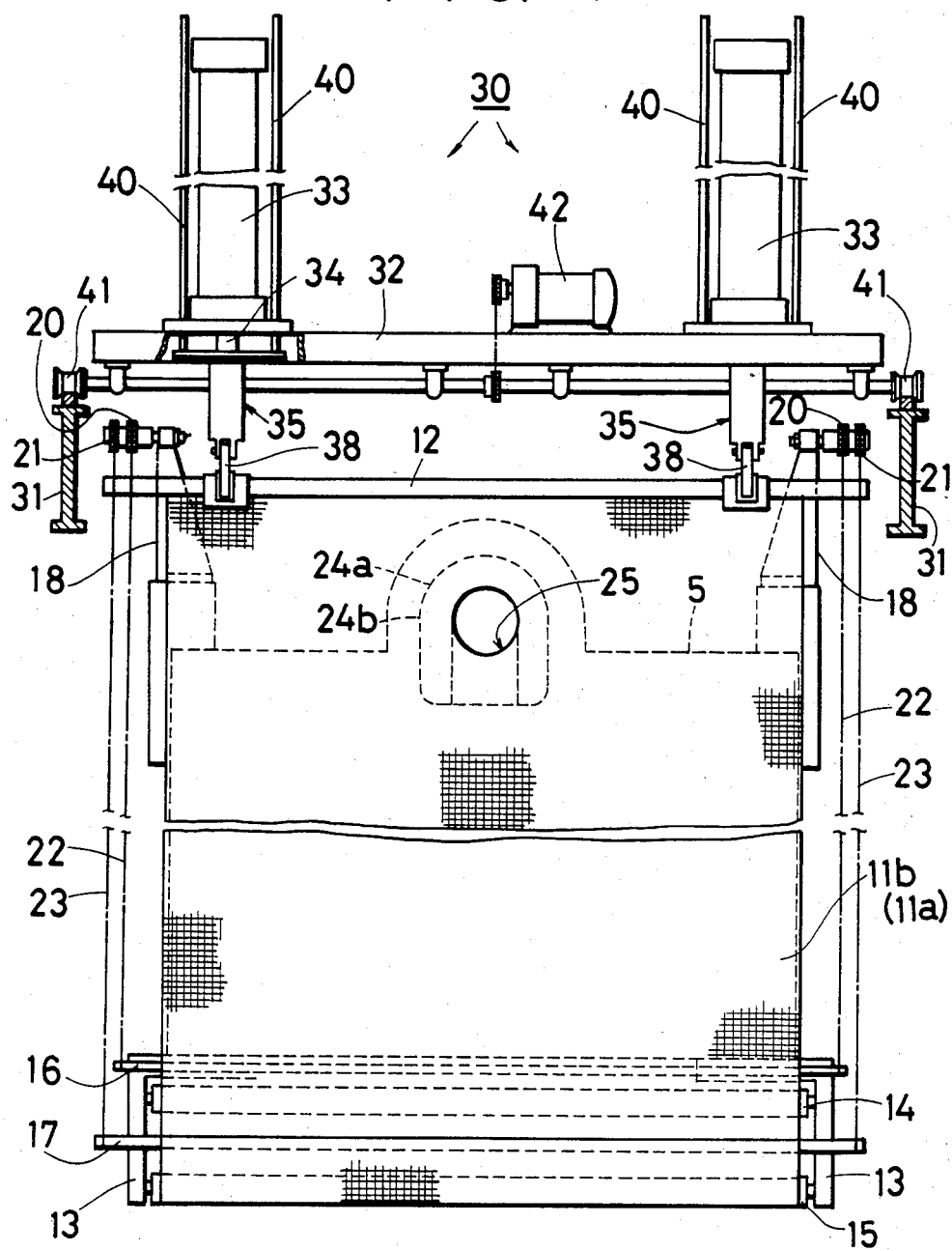
FIG. 4 is a front view showing filter-cloth moving means between filter plates as separated.
Figure 5:
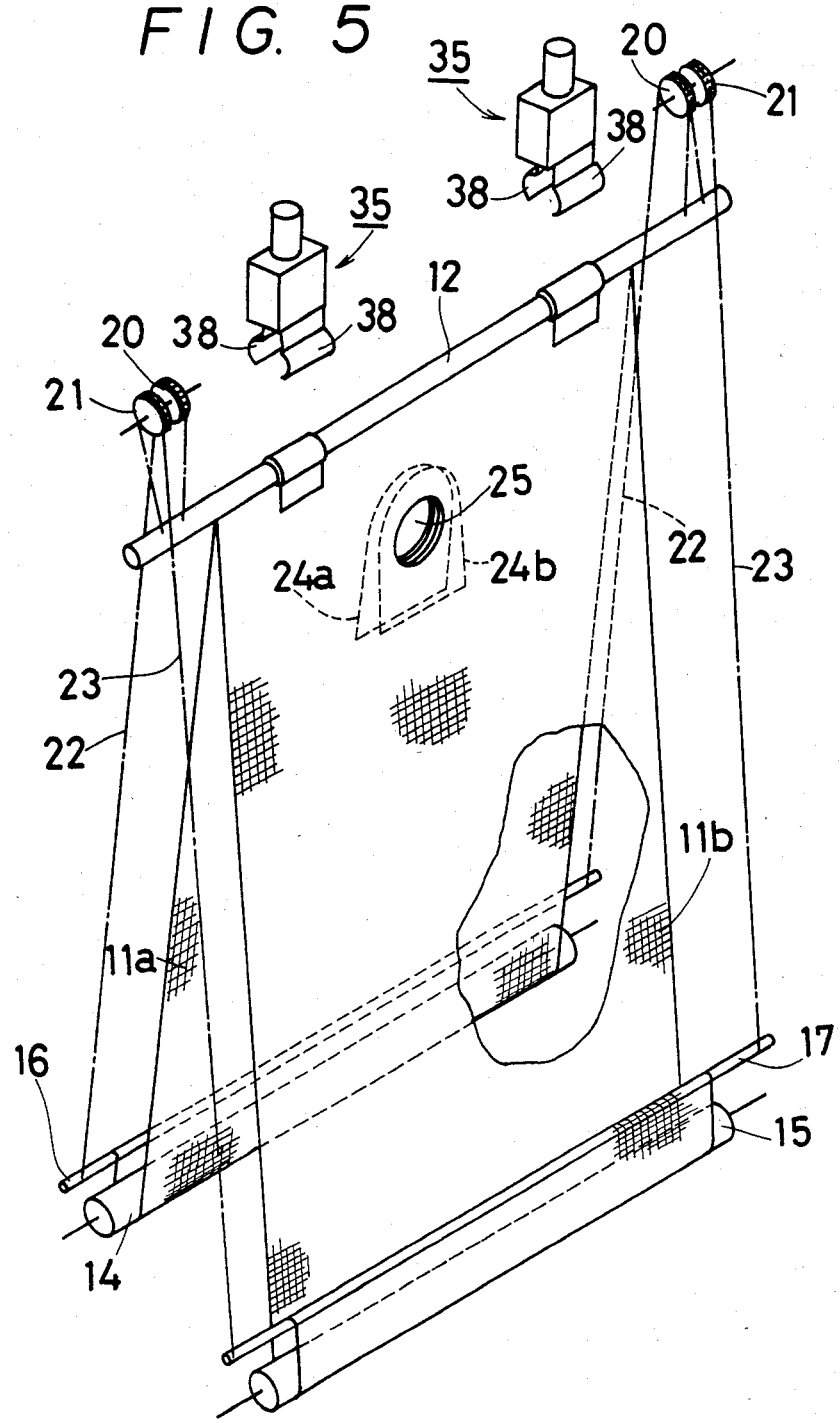
FIG. 5 is a perspective view showing one aspect of the filter-cloth moving means.

In FIG. 4, reference numeral 40 designates a guide bar mounted on the top of said holding means, which guide bar 40 is slidably supported in upright state on the carriage 32. Numeral 41 is a wheel which movably supports the carriage 32 on the rails 31, 31, numeral 42 is a drive motor for the carriage. In FIG. 6, 43 is a spring for urging the piston 39b of the hydraulic cylinder 39 in the direction of stretch of the piston rod 39a.

Constructed as above described, the filter press of the invention as shown in FIGS. 1 to 6 can be operated in the following manner.

To carry out filtering operation, filter cloths 11a, 11b disposed between each two adjacent filter plates 5, 5 are kept in their elevated position, a position such that they cover the surfaces 5a, 5b of the filter plates 5, 5, and the piston rod 8 of the hydraulic cylinder 7 is stretched to close the filter plates 5, 5—. Thereupon, slurry is supplied between the filter cloths 11a, 11b through feed plates 24a, 24b so that filtering operation can be performed.

To remove cakes as produced between the filter cloths 11a, 11b as a result of the filtering operation, the piston rod 8 is contracted, and then filter plates 5, 5—are shifted one by one toward the clamping head 6 and in order of proximity to the clamping head 6 so as to provide a specified space a between two adjacent plates 5, 5 separated. Each time two plates 5, 5 are separated to the specified distance a, the ready-to-engage-and-disengage drive mechanism 30 for filter-cloth suspension bar is elevated to an upper position between the plates 5, 5. That is, said motor (for example, pulse motor) is driven a specified amount each time to move the ready-to-engage-and-disengage suspension-bar holding means 35, 35 on the carriage 32 to a position right above the filter-cloth suspension bar 12 between the filter plates 5, 5. Then, piston rods 34, 34 of the hydraulic cylinders 33,33 to which said holding means 35, 35 are attached are stretched a specified amount to lower each pair of arms 38, 38, as kept opened, to a specified level. Thereupon, each pair of arms 38, 38 are closed to grasp and hold the suspension bar 12. When this condition has been reached, if piston rods 34, 34 are further stretched, the cloths 11a, 11b between separated two plates 5, 5 are displaced so that their portions above the levels of the rollers 14, 15, that is, portions of the cloths on which cakes are present, are lowered to the levels of the rollers 14, 15, their opposed surfaces being turned away from each other at the roller levels 14, 15 so that cakes are allowed to drop off the cloths.

In this embodiment, the filter cloths 11a, 11b are constantly kept under tension between their upper and lower ends by chains 22, 23 connecting between the filter-cloth suspension bar 12 and the filter-cloth securing bars 16, 17 and are given movement with U-turn about the rollers 14, 15, the lower extremities for movement of their portions subject to cake removal being the roller positions at 14 and 15, at which cloth movement turns upward. If those portions of the cloths 14, 15 which are subject to cake removal have reached said lower extremities and if cakes have been removed, then the piston rod 34 of the hydraulic cylinder 33 is contracted a specified amount, whereupon the filter-cloth suspension bar 12 is elevated to a level above the filter plate so that the cloths 11a, 11b are allowed to return to a level at which they can cover the surfaces of the plates. Then, if the piston rod 39a of the hydraulic cylinder 39 is stretched, hold of the filter-cloth suspension bar 12 by pairs of arms 38, 38 is released; and if the piston rod 34 of the hydraulic cylinder 33 is further contracted, then the ready-to-engage-and-disengage means 35 for holding filter-cloth holding bars are elevated. When this condition has been reached, the front-side one of the two adjacent plates 5, 5 is moved rearward and the next two adjacent filter plates 5, 5 are separated from each other, whereupon the carriage 32 can be moved forward by an amount corresponding to the width of one plate. Thus, cake discharge operation can be carried out between the newly separated two plates 5, 5 in same manner as above described.

No scraper or cleaning means are shown in the drawings. Provision of scrapers and/or cleaning means at suitable locations adjacent the path of downward movement of the filter cloths 11a, 11b will be of help: scrapers will serve as supplementary means for the purpose of cake removal, and cleaning means will serve for the purpose of cleaning the filtering surfaces of the cloths after cake removal.

One form of filter press embodying the present invention has now been described with reference to FIGS. 1 through 6. Needless to say, the filter-cloth moving means arranged between each two adjacent filter plates, including filter cloths secured at the upper ends thereof to the filter-cloth suspension bar, or suspension-bar drive means which are readily engageable and disengageable relative to the suspension bar, are not limited to the form of the embodiment. They may be modified in various ways.

Figure 7:
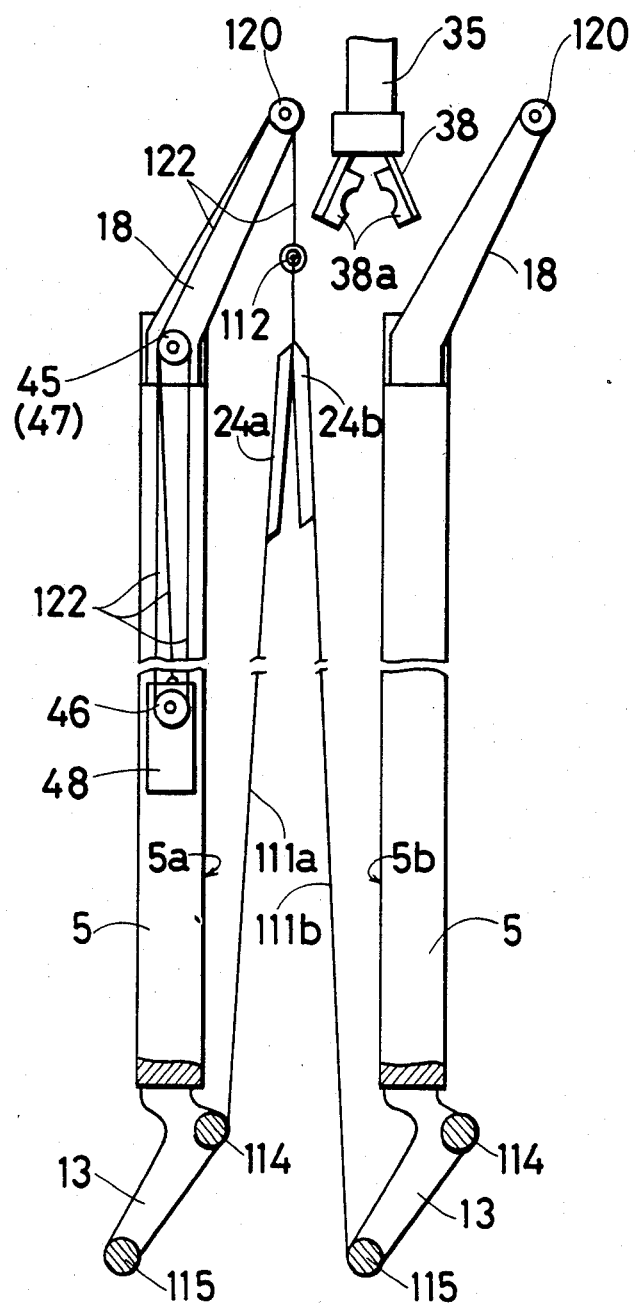
FIGS. 7 and 8 are side views illustrating filter cloths as they appear between two adjacent filter plates separated, in another embodiment of the invention.
Figure 8:
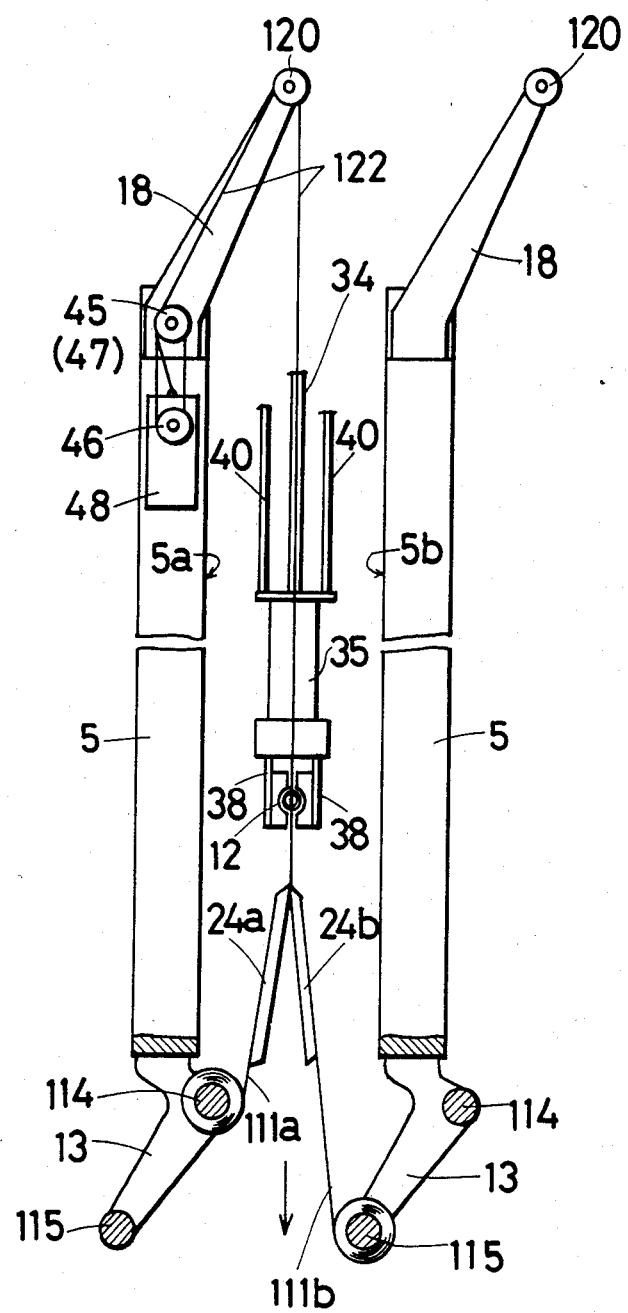

Referring to FIGS. 7 and 8 which show another form of filter-cloth moving means by way of example, reference numerals 111a and 111b designate a pair of filter cloths arranged between two adjacent filter plates 5, 5 so as to cover the surfaces 5a, 5b thereof. The upper ends of the cloths 111a, 111b are secured to a filter-cloth suspension bar 112 just as in the first embodiment. Filter cloth 111a, one of the pair, has its lower end portion wrapped on a roller 114, one of two rollers 114, 115 disposed below the front-side filter plate 5 and rotatably supported by a bracket 13, the lower extremity of the cloth 111a being secured to said roller 114. Similarly, the other filter cloth 111b has its lower end portion wrapped on a roller 115, one of two rollers 114, 115 disposed below the rear-side filter plate 5 and rotatably supported by a bracket 13, the lower extremity of the cloth 111b being secured to said roller 115, Said rollers 114, 115 are respectively provided with springs (not shown) adapted to energize them to rotate on their own axes to wind the cloths 111a, 111b.

To the suspension bar 112 is connected one end of a rope 122 which is carried over a series of pulleys, including a pully 120 rotatably supported above the front-side filter plate 5, a first stationary pulley 45, a running block 46, and a second stationary pulley 47, one concentric with the first stationary pulley 45, in order of passage, the other end of the rope 122 being connected to a weight by which said running block 46 is rotatably supported.

Through this arrangement, filter cloths 111a, 111b can be constantly held under tension, and the filter-cloth suspension bar 112 is kept at its elevated position as shown in FIG. 7, in normal state (a state in which the force of said springs and weight of cakes are in balance with said weight 48 so that filter cloths are held stationary) when the plates are opened.

As can readily be appreciated from FIG. 7, the ready-to-engage-and-disengage drive means 30 for filter-cloth suspension, or more specifically, the suspension-bar holding means 35 as illustrated in FIGS. 1 to 6 can be employed with this modified form of filter-cloth moving means. That is, if said holding means 30 is caused to act on the filter-cloth suspension bar between two adjacent filter cloths separated, filter cloths 111a, 111b are lowered with respect to their respective portions extending between the suspension bar 112 and the rollers 114, 115 (on which their lower portions are wound) to allow removal of cakes from their surfaces as in the case of the first embodiment. In the present instance, it is to be noted that filter cloths 111a, 111b are wound onto the rollers 114, 115 respectively so that the weight 48 is elevated.

Figure 9:
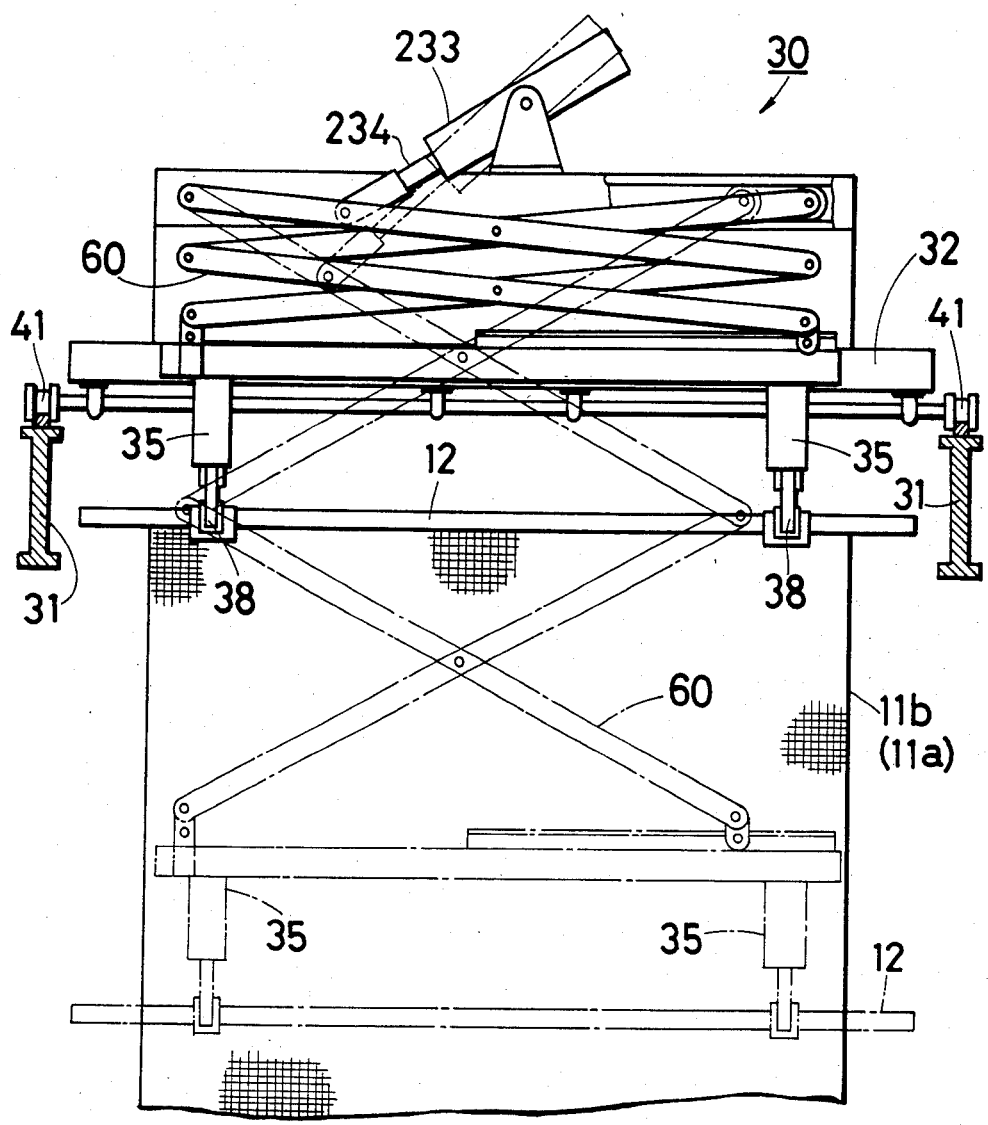
FIG. 9 is a front view showing drive means for filter-cloth suspension bar in still another embodiment.

Referring next to FIG. 9 there is illustrated a modified form of filter-cloth suspension-bar drive means adapted for ready engagement with and disengagement from the suspension bar. In the first embodiment, the suspension-bar holding means is connected directly to the piston rod 34 of the hydraulic cylinder 33 for giving up and down movement to said means. As an alternative, the holding means 35 may be attached to the underside of the hydraulic cylinder through a pantograph, for example. In FIG. 9, a pair of ready-to-engage-and-disengage holding means 35, 35 for holding a filter-cloth suspension bar, which are similar to the correponding means in the first embodiment, are supported on a carriage 32 through a pantograph 60 to which is connected a short piston rod 234 of a hydraulic cylinder 233. In this instance, if the piston rod is stretched or contracted, the pantograph 60 is downwardly stretched or contracted to lower or elevate the holding means 35, 35.

In the above described embodiments, the filter plates are separated one by one to allow up and down movement of a pair of filter cloths between two adjacent plates. According to the invention it is possible to arrange so that the filter plates are separated by twos or threes, for example, and so that cakes present on pairs of filter cloths are simultaneously removed between more than two adjacent plates separated. In that case, pairs of ready-to-engage-and-disengage drive means for driving filter-cloth suspension bars should be disposed on the carriage 32 in spaced apart relation along the length of the guide rails.

The filter press according to the invention has been described above with reference to several embodiments. In essence, the filter press of the invention comprises a pair of filter cloths disposed between each two adjacent ones of the plate so as to cover the surfaces thereof and which are secured at the upper ends thereof to a filter-cloth suspension bar, one of said filter cloths being so disposed as to cover the surface of front-side one of the two adjacent plates and in engagement at the lower end portion thereof with a roller disposed below said front-side plate, the other one of said cloths being so disposed as to cover the surface of rear-side one of said two adjacent plates and in engagement at the lower end portion thereof with a roller disposed below said rear-side plate, said filter cloths each being up and down movably supported for movement over the length of its portion extending between said suspension bar and one or the other of said rollers. The filter press is further characterized by the fact that drive means for moving each of the filter cloths upwardly over said length of its portion between said suspension bar and said roller consists of a filter-cloth suspension-bar driving mechanism adapted for ready engagement with and disengagement from said suspension bar. Therefore, in case where that portion of each filter cloth which corresponds to said length is under downwardly urging force in its normal state, the cloth can be moved up and down for removal of cakes therefrom by a simple operation of bringing said suspension-bar drive means in engagement with the suspension bar to elevate the latter. Where the cloth is not under such force in its normal state, said suspension-bar drive mechanism is put in engagement with the suspention bar and moved up and down, whereby the cloth can be given up and down movement for cake discharge. According to the invention, therefore, it is possible to drive said portion of the filter cloth up and down between each two adjacent plates to allow smooth discharge of cakes.

As this invention may be embodied in several forms without departing from the spirit and scope thereof, it is to be understood that the invention is not limited to the specific embodiments thereof except as defined in the appended claims.

What is claimed is:

1. A filter press having a multiplicity of filter plates arranged side by side on a pair of guide rails extending in parallel and which can be separated one by one or twos, comprising a pair of filter cloths disposed between each two adjacent ones of the plates so as to cover the surfaces thereof and which are secured at the upper ends thereof to a filter-cloth suspension bar, one of said filter cloths being so disposed as to cover the surface of front-side one of said two plates and movably engaged and guided by a roller disposed below said rear-side plate, the lower end of said other filter cloth being secured to another filter-cloth securing bar, said filter-cloth securing bars being connected to said filter-cloth suspension bar through cord-like drive elements, each trained around a wheel disposed above the filter plates, and drive means for moving each of the filter cloths upwardly over the length of the filter cloth's portion extending between said suspension bar and one or the other of said rollers, said means consisting of a filter-cloth suspension-bar driving mechanism which comprises a pair of rails disposed above the filter plates and in parallel relation to said guide rails, a carriage movably mounted on said pair of rails, one or more hydraulic cylinders mounted on said carriage, a pair of arms having their respective bases pivotally supported at the front end of a piston rod for each hydraulic cylinder, and further hydraulic cylinders for simultaneously actuating free ends of said arms to open and close.

* * * * *